March 10, 1936.  F. E. MYARD  2,033,733
HOMOKINETIC TRANSMISSION JOINT
Filed May 22, 1935
Fig. 1
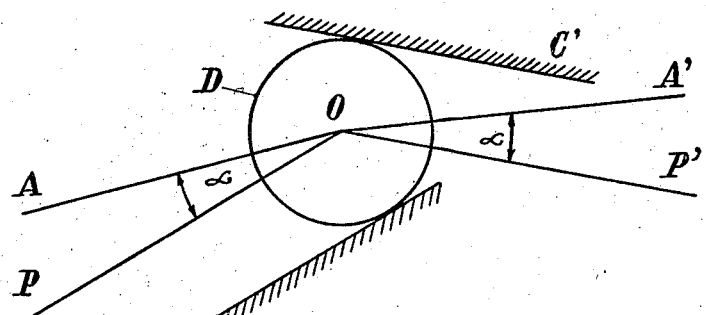
Fig. 2
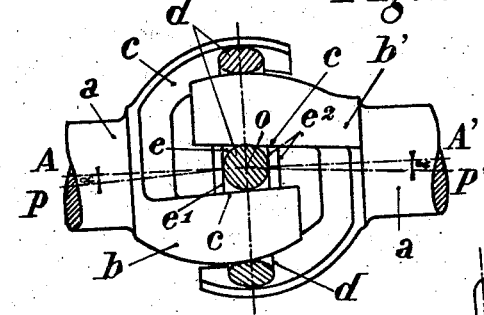
Fig. 5
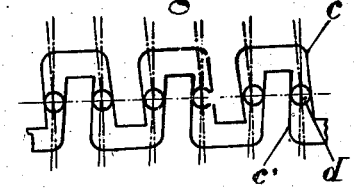
Fig. 4
Fig. 3
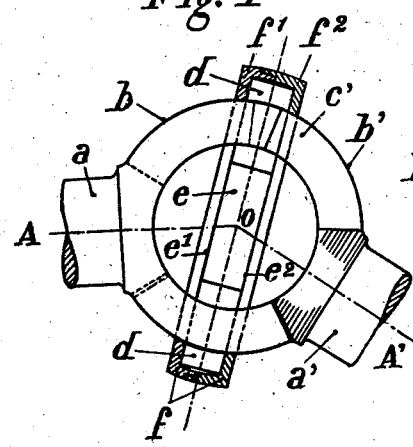
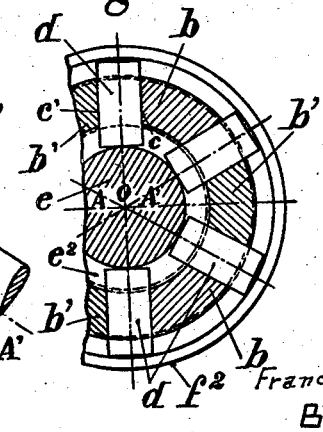
INVENTOR
Francis E. Myard
BY
Emil Börnelyche
ATTORNEY Patented Mar. 10, 1936

2,033,733

UNITED STATES PATENT OFFICE 2,033,733

HOMOKINETIC TRANSMISSION JOINT

Francis Emile Myard, Paris, France

Application May 22, 1935, Serial No. 22,926
In France May 26, 1934

3 Claims. (Cl. 64—21)

This invention relates to a homokinetic transmission joint which is more particularly adapted for front driving wheels of motor cars. The said joint insures the rotary connection of two concurrent shafts which may become inclined one with respect to the other.

The essential means for this connection consists in using a series of fundamental planes which are conjugated two by two and which go through the concurrent point of the axes of the shafts, each of the said planes making with the corresponding axis with which it is connected a small and equal angle of inclination, but in a reverse direction for both conjugate planes.

The use of such inclined fundamental planes is the feature by which my invention differs from other solutions which have been already suggested for solving the problem and which comprise similar means, the latter being, however, arranged in a more complicated and more expensive manner.

Plane surfaces arranged parallel to the fundamental planes are located at the same distance from the said planes and cylinders of revolution having for their axis the intersection of the fundamental planes and for their radius the above mentioned distance are connected with another so as to remain in the same middle plane, which, of course, will be the bisecting plane of the system.

The rollers may be replaced by balls, the thrust surfaces being then replaced by toric surfaces of the same diameter centered on the concurring point of the axes.

The invention will be now more particularly described with reference to the appended drawing, in which Figure 1 is a diagrammatical geometrical view of the joint according to my invention;

Figure 2 is a plan view of a form of execution of the joint;

Figure 3 is a sectional view taken on the line 1—1 of Figure 2;

Figure 4 is an elevational side view of the same joint, and

Figure 5 shows the development of the same joint according to the middle part of the casing containing the cylinders.

The two shafts $a$ and $a'$ to be connected have their geometrical axes OA, OA' intersecting at the point O. If two fundamental planes OP, OP' are considered, which pass through O, which are connected with the axes OA, OA' respectively and make with the same two equal and reverse angles $\alpha$, then the intersection of the planes OP, OP' is a straight line passing through the point O.

Two plane surfaces C, C' corresponding to the planes OP, OP' and parallel to the latter are provided at the same distance from the planes OP, OP' respectively on either side of the said planes. A cylinder D having for its axis the intersection of the planes OP, OP' and for its radius the common distance of the surfaces C, C' from the planes OP, OP' will always be tangent to both surfaces C, C'.

I provide a series of conjugate planes P, P' which make equal angles two by two with the axes OA, OA', (the said angles being not necessary equal to each other for the different conjugated planes), a plurality of corresponding surfaces C, C' and a plurality of corresponding cylinders D. I connect the cylinders with each other so that their axes remain in the same plane.

Under such conditions the cylinder axes which are nothing other than the intersections of the conjugate planes P, P', can be only in the bisecting plane of the angle AOA'.

This connection of the cylinders will be obtained by means of a casing centered on O by the action of suitable reactions resulting from the necessity for the cylinders to have their axes in the same plane. The driving of the driven shaft by the driving shaft is insured for any mutual inclination of the said shafts and this connection will be a homokinetic one. It is to be noted that this connection, which is characterized by the combination of the reversely inclined fundamental planes with cylinders which must remain in the same plane, is always determined, even when the shafts are in a straight line, which result is not always obtained with the similar solutions which have been formerly suggested.

The inclination of the fundamental planes on the axes OA, OA' has preferably only a small value so as to avoid appreciable reactions when the axes are aligned.

On the other hand, the value of the angle $\alpha$ as well as the diameter of the cylinders can vary from a pair of conjugate planes to another.

In the form of execution shown in Figures 2, 3 and 4, two symmetrical forks $b$, $b'$ with three prongs for instance, which are limited inwardly and outwardly by spherical surfaces having a common centre O and the same diameter, are provided with plane successive and conjugate faces between which are located the rolls $d$. The forks $b$ and $b'$ may have only two prongs, which entails a simplification of the construction.

Each pair of conjugate faces such as $c$, $c'$ is arranged in such a manner that the face C is parallel to the fundamental plane P at a distance from the latter which is equal to the radius of the roll, while the other face C' is parallel to the other fundamental plane P' which is inclined on the axis with the same angle as P with respect to the axis A', but in the reverse direction, said face C' being at a distance from the plane P' which is equal to the radius of the roll d, but on the side opposite to the face e.

The roll unit d is arranged in a casing comprising an outer casing member f with a concave wall engaging the outer ends of the rollers and an inner member e with a convex wall engaging the inner ends of the rollers, both members having parallel plane side faces which hold the rolls and insure the position of their axes in the same plane, which will be the plane bisecting the angle AOA'.

It can be seen that according to the selected arrangement the rolls can take only a determined position for a determined orientation of the axes. The development of Figure 5 shows that the forks b, b' are locked (through the intermediary of the rolls) on the common centre O; they can neither move towards each other nor separate from each other. This, of course, results from the reverse and equal inclinations of the fundamental planes.

In order to facilitate the assembly of the rolls inside the forks, the end of the fork fingers may be formed with a cylindrical part offering a more convenient passage for the inner member e. On the other hand, the casing outer member f is in two parts $f_1$, $f_2$ connected with each other in any manner, for instance through pins or through screws.

Normally the rolls d have a constant diameter along their length, but they could have different diameters from the diameter corresponding to their middle working zone at their ends; the members of the casing between the flasks, which are formed by the pieces e and f, will then be made in consequence.

I claim as my invention:

1. A homokinetic joint for coupling two rotary shafts with concurrent axes, comprising a fork on the end of one of the shafts having arms with plane interior faces inclined equally relatively to the axis of the shaft and at equal distance from the point of intersection of the two shafts, a fork on the end of the other shaft having arms with plane interior faces inclined equally to the axis of said other shaft at an angle equal to the inclination of the first fork arm faces but in opposite direction and at the same equal distance from said point of intersection, said two forks being disposed symmetrically about said point with an arm of one fork alternating with an arm of the other fork, cylindric rollers each bearing simultaneously on a plane face of one fork and a plane face of the other fork, and means for holding the rollers with their axes in the same plane.

2. A homokinetic joint for coupling two rotary shafts with concurrent axes, comprising a fork on the end of one of the shafts having arms with plane interior faces inclined equally relatively to the axes of the shaft and at equal distance from the point of intersection of the two shafts, a fork on the end of the other shaft having arms with plane interior faces inclined equally to the axis of said other shaft at an angle equal to the inclination of the first fork arm faces but in opposite direction and at the same equal distance from said point of intersection, said two forks being disposed symmetrically about said point with an arm of one fork alternating with an arm of the other fork, cylindric rollers each bearing simultaneously on a plane face of one fork and a plane face of the other fork, and a cage with opposite plane parallel side walls engaging the circumference of the rollers.

3. A homokinetic joint for coupling two rotary shafts with concurrent axes, comprising a fork on the end of one of the shafts having arms with plane interior faces inclined equally relatively to the axis of the shaft and at equal distance from the point of intersection of the two shafts, a fork on the end of the other shaft having arms with plane interior faces inclined equally to the axis of said other shaft at an angle equal to the inclination of the first fork arm faces but in opposite direction and at the same equal distance from said point of intersection, said two forks being disposed symmetrically about said point with an arm of one fork alternating with an arm of the other fork, cylindric rollers each bearing simultaneously on a plane face of one fork and a plane face of the other fork, a cage for holding the rollers with their axes in the same plane, said cage having a member with a concave wall surface engaging the outer ends of the rollers, and a member with a convex wall surface engaging the inner ends of the rollers and opposite plane parallel side walls engaging the circumference of the rollers.

FRANCIS EMILE MYARD.